Nov. 28, 1961    R. J. FLORA    3,010,531
LOCK MEANS FOR AUTOMOTIVE VEHICLES

Filed June 2, 1958    2 Sheets-Sheet 1

INVENTOR
RALPH J. FLORA

BY *Gustave Miller*
ATTORNEY

Nov. 28, 1961  R. J. FLORA  3,010,531
LOCK MEANS FOR AUTOMOTIVE VEHICLES
Filed June 2, 1958  2 Sheets-Sheet 2

INVENTOR
RALPH J. FLORA

BY Justan Miller
ATTORNEY

United States Patent Office 3,010,531
Patented Nov. 28, 1961

3,010,531
LOCK MEANS FOR AUTOMOTIVE VEHICLES
Ralph J. Flora, U.S. Army. (Trailer Court 1, Lot 277, Fort Bragg, N.C.), assignor of one-half to Gustave Miller, Washington, D.C.
Filed June 2, 1958, Ser. No. 739,206
7 Claims. (Cl. 180—82)

This invention relates to attachments for automotive vehicles, and it particularly relates to apparatus for preventing the theft of such vehicles.

An increasing problem today is the theft of parked cars from streets or even from garages. Thousands upon thousands of dollars are lost in this way both by the car owners and by insurance companies. This has resulted not only in undue expense and inconvenience on the part of the car owners but also in the rise of insurance rates.

It is one object of the present invention to provide a means which, when applied to an automotive vehicle, will prevent tampering therewith and any theft thereof.

Another object of the present invention is to provide a means of the above type which is easily accommodated on all standard types of vehicles.

Other objects of the present invention are to provide an improved anti-theft means for automotive vehicles, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which.

Figure 1:
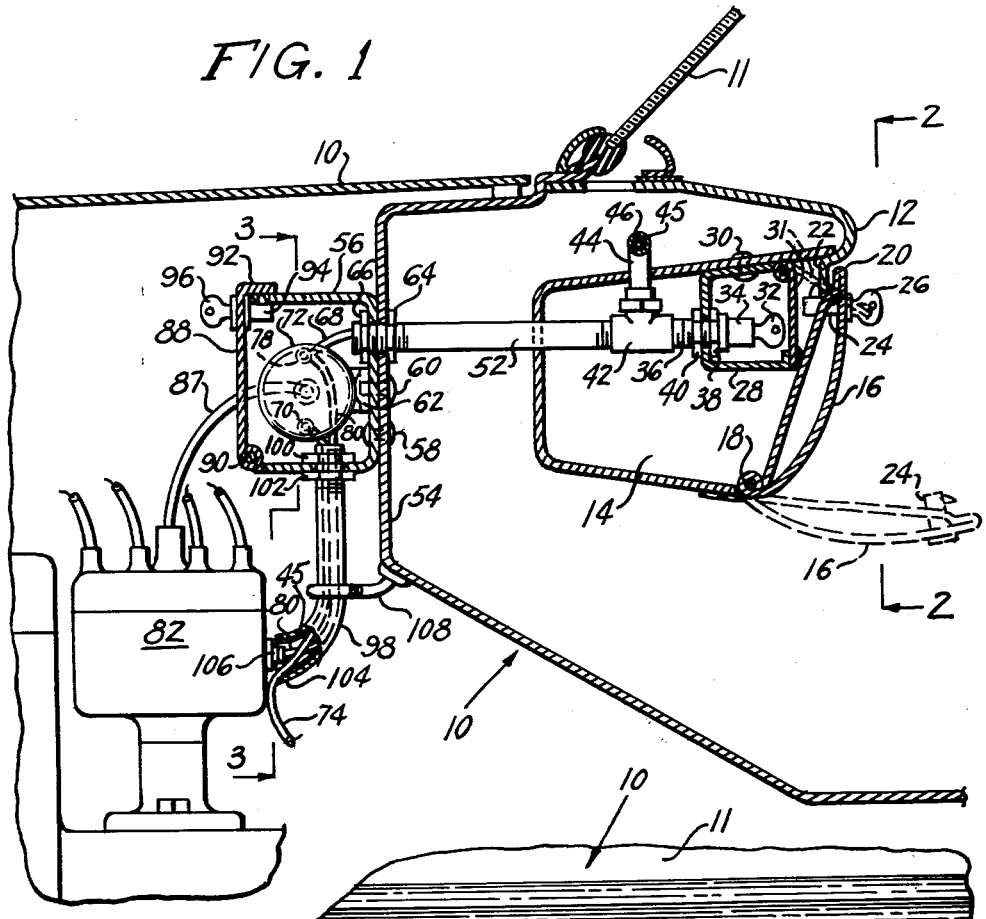
FIG. 1 is a side view, partly in section and partly in elevation, of an apparatus embodying the present invention and included within an engine-starting system.

Referring now in greater detail to the drawings wherein similar reference characters refer to similar parts, there is shown a vehicle 10 including a windshield 11 and having an instrument panel 12 behind which is situated a first housing constituted by a glove compartment 14. This first housing or glove compartment 14 has a door 16 hinged at 18 to the underside of the compartment 14 and having an upper edge 20 adapted to overlap the flange 22 at the upper edge of the open front of the glove compartment 14. A lock 24 operated by a key 26 is adapted to lock the glove compartment. The walls of the glove compartment 14 are preferably made of steel or other very strong material; if not, then a separate steel box may be used on the dashboard for the purpose of this invention.

Within the first housing or glove compartment 14 is provided a second housing 28 which is riveted to the upper wall of the glove compartment 14, as at 30. The second housing 28 is provided with a hinged door 31 which is kept closed by being abutted at its lower, free end by the inner wall of the compartment door 16 (as shown in full line in FIG. 1). Within the second housing 28 is a switch 34 operated by a key 32. This switch 34 is connected to one end of an externally-threaded iron pipe 36 extending through the front wall of the second housing 28. This pipe 36, as well as all the other conduit pipes, is lined with insulating material such as rubber 45 or the like and is fixed in place by a pair of nuts 38 and 40, one on each side of the front wall of second housing 28.

Figure 2:
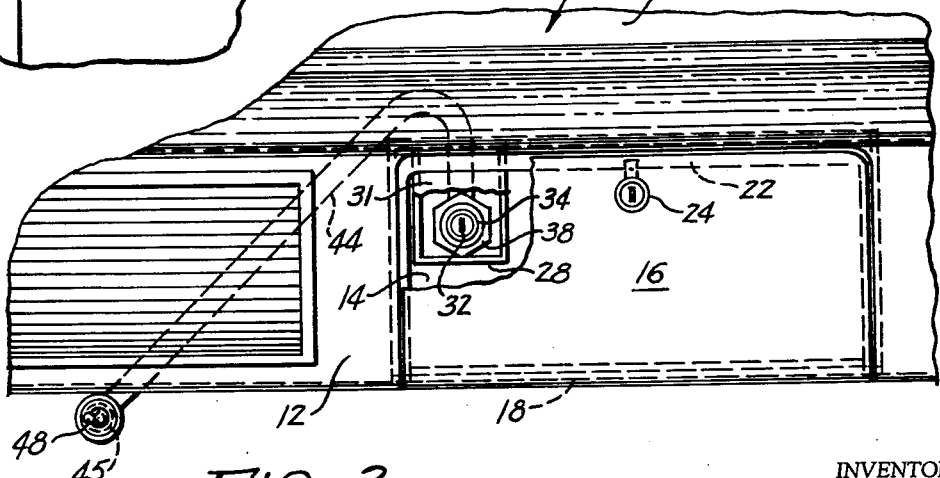
FIG. 2 is a view, partly broken away, taken on line 2—2 of FIG. 1.
Figure 3:
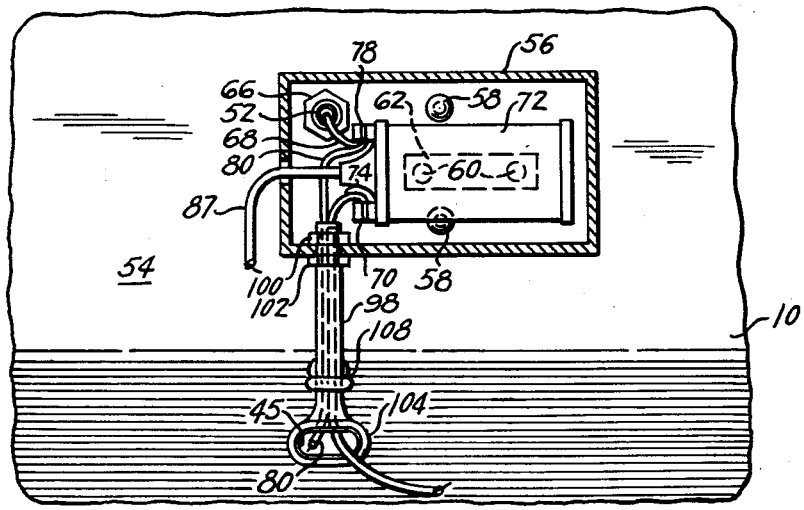
FIG. 3 is a view, partly in elevation and partly in section, taken on line 3—3 of FIG. 1.
Figure 4:
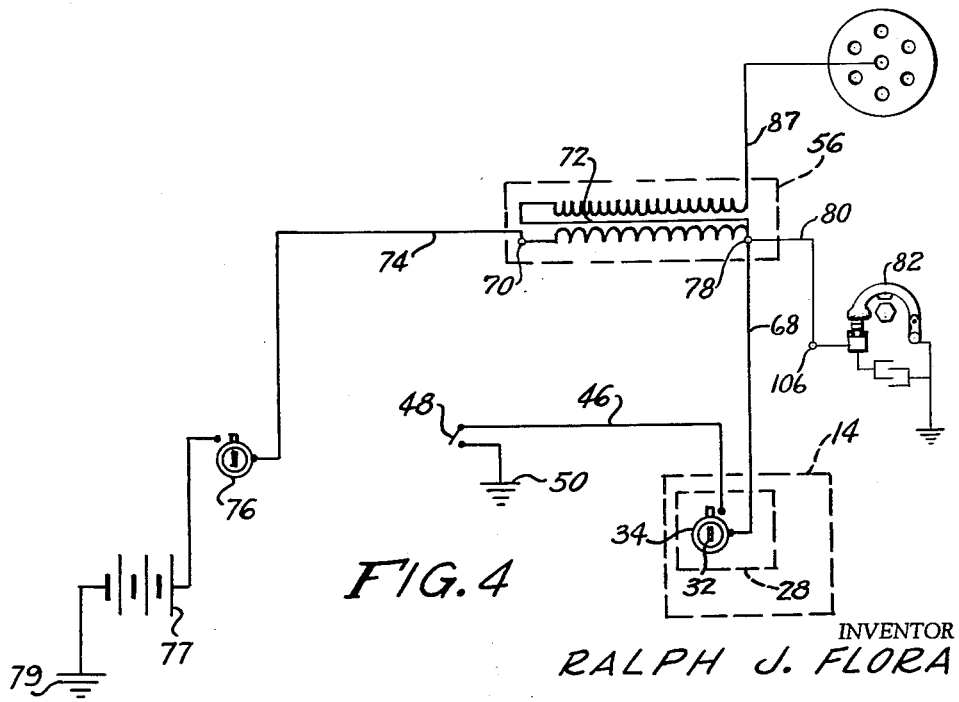
FIG. 4 is a schematic view of the ignition circuit and its associated parts.

At its other end, pipe 36 is threadedly connected to a T-coupling 42 from which extends a pipe 44. An electrically conductive line 46 is adapted to be electrically connected to the switch 34 and extends through the pipe 44 to a snap switch 48 (best seen in FIG. 2). The snap switch assembly is connected to ground in a conventional manner.

The coupling 42 is also connected to one threaded end of a heavy iron pipe 52 which extends through the rear wall of first housing or compartment 14 and through the front or fire wall 54 of the vehicle 10. It also extends into a third housing 56 made of steel or the like. The third housing 56 is riveted to the wall 54, as at 58, and may also be connected thereto by round-headed bolts 60 having lock nuts 62 inside third housing 56 to prevent tampering therewith.

The pipe 52 is connected both to wall 54 and third housing 56 by means of lock nuts 64 and 66; nut 64 engaging wall 54 and nut 66 engaging the rear wall of third housing 56 within the third housing itself.

An electrical line 68 extends from switch 34 through pipe 36, coupling 42 and pipe 52 to terminal 78 of ignition coil 72 within third housing 56. The terminal 70 is electrically connected through line 74 to the ignition switch 76 adapted to be connected to battery 77 which is grounded at 79. The terminal 78 of the coil 72 also is connected through line 80 to the points of a distributor 82 and to ground in a conventional manner. A cable 87 connects coil 72 to distributor 82.

The third housing 56 has an open front which is closable by a door 88 which is hinged at the bottom within the third housing 56, as at 90, and which is provided with a flange 92 at its upper edge. The flange 92 overlaps the top wall of the third housing 56 when the door 88 is closed so that the door cannot be jimmied. A lock 94 operated by a key 96 holds the door 88 locked in closed position.

The lines 74 and 80, leading respectively to ignition switch 76 and distributor assembly 82, extend from coil 72 through an iron pipe 98 which is connected to the bottom wall of third housing 56 by an interior nut 100 and an exterior nut 102. Both this iron pipe 98 and the iron pipes 36 and 52 are preferably provided with an electrically insulating lining, preferably of rubber or the like. This is also true of coupling 42 and pipe 44 as well as any other electrically-conducting metal conduits or the like through which the electrical wires extend.

The pipe 98 is flared at its lower end 104 so as to encompass the distributor terminal 106, and is held by a clamp support 108 extending from wall 54 in order to prevent the pipe 98 from being bent away from the distributor 82.

With the above type of system, it would be extremely difficult if not impossible to tamper with the ignition system of a vehicle which has been properly locked and, therefore, the likelihood of any theft of the vehicle is reduced to a minimum. The pipe 98 would make it impossible to use another coil with the distributor, for the upper end of the pipe 98 within the third housing 56 is located substantially against the bottom of ignition coil 72, so that the pipe 98 cannot be pushed into third housing 56, even if nut 102 is loosened.

The use of the starting system itself is obvious. When the ignition switch is on and the key switch 34 and snap switch 48 are disconnected with the coil 72, the vehicle may be started in the ordinary manner. However, with the switch 34 locked closed in the circuit and the key 32 removed, the circuit remains grounded and the engine cannot be started. This is of especial value when the owner is gone for a relatively long period of time. However, when the owner is gone for only a short time, he may not wish to bother unlocking the first housing or glove compartment 14, locking the switch 34 closed, removing the key 32 and relocking the compartment 14. In that case, he may simply close the snap switch 48 which will ground the circuit to the ignition coil. The switch 48 may be placed in any hidden or other place desired by the owner.

Obviously, if preferred, the switches 34 and 48 may be connected in series with the ignition switch 76, ignition coil 72 and the distributor terminal 106 by means of a second electrical wire, or two-wire circuit extending through the pipes 98, 52, 56 and 44, thus providing means to maintain the ignition circuit open by lock switch 34 or switch 48, instead of grounding the ignition coil as previously described, in order to prevent an unauthorized person from starting the engine after closing the ignition switch 76.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A locking system for internal combustion engines comprising a first housing, an opening in said housing, a door adapted to close said opening, means to lock said door closed, a second housing within said first housing, an opening closable by a door in said second housing, a key-operated switch in said second housing, a rigid pipe connecting said switch to a third housing, an opening in said third housing, a door adapted to close said opening in said third housing, a locking means for said last-mentioned door, an ignition coil in said third housing, an electrical line extending from said key-operated switch in said second housing through said pipe to said coil, a second rigid pipe extending from said third housing to a distributor assembly and electrical lines extending from said coil through said second pipe to a contact on said distributor assembly and to an ignition switch connected to a source of electrical energy.

2. The system of claim 1 wherein a third rigid pipe is connected between said key-operated switch and an alternate switch, an electrical line extending from said key-operated switch through said third rigid pipe to said alternate switch.

3. The system of claim 2 wherein all said rigid pipes are lined with electrically insulating material.

4. The system of claim 1 wherein said second rigid pipe is provided with a flared end encompassing said contact on said distributor assembly.

5. A locking system for internal combustion engines comprising a distributor assembly, an ignition coil device and a lock switch means, a rigid, relatively unbreakable conduit having electrically conductive means therein connecting said distributor assembly to said ignition coil, a second rigid, relatively unbreakable conduit having electrically conductive means therein connecting said ignition coil to said lock switch means, a source of electrical energy, an ignition switch means electrically connecting said ignition coil to said source of electrical energy, said lock switch means connecting through ground to said source of electrical energy, a first housing, a second housing within said first housing, a lockable door in said first housing, said lock switch means being located within said second housing, said second conduit extending through a wall of said first housing and a wall of said second housing and connected to said lock switch means, a relatively non-breakable third housing, and a lockable door internally hinged in said third housing, said ignition coil being located within said third housing, said first and said second conduits each extending through a wall of said third housing.

6. The system of claim 5, a key operable lock in said door of said third housing, and a lateral flange at the free edge of said door in a position to overlap the adjacent wall of said first housing when said door is in closed position.

7. The system of claim 6, a third rigid, relatively unbreakable conduit branching from said second conduit within said first housing through a wall of said first housing, and an alternate switch means in said third conduit interposed in series between said lock switch means and ground.

References Cited in the file of this patent
UNITED STATES PATENTS

| | | |
|---|---|---|
| 1,348,090 | Cooper | July 27, 1920 |
| 1,591,606 | Bogg | July 6, 1926 |
| 1,889,343 | Bahnyak | Nov. 29, 1932 |
| 2,242,142 | Parker | May 13, 1941 |
| 2,483,284 | Jacobi | Sept. 27, 1949 |
| 2,793,706 | Moreland | May 28, 1957 |
| 2,861,644 | Martin | Nov. 25, 1958 |